(12) United States Patent
Cattrone et al.

(10) Patent No.: US 8,550,350 B2
(45) Date of Patent: Oct. 8, 2013

(54) COLOR BARCODE WITH ENHANCED CAPACITY AND READABILITY FOR A CLOSED LOOP SYSTEM

(75) Inventors: Paul Cattrone, Pleasant Hill, CA (US); Hiroshi Tomita, Palo Alto, CA (US); Vivek Pathak, Mountain View, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1316 days.

(21) Appl. No.: 11/363,960

(22) Filed: Feb. 28, 2006

(65) Prior Publication Data

US 2007/0199994 A1    Aug. 30, 2007

(51) Int. Cl.
*G06K 7/00* (2006.01)

(52) U.S. Cl.
USPC ............. 235/462.04; 235/462.01; 235/494

(58) Field of Classification Search
USPC ........... 235/435, 439, 454, 462.01, 462.04, 235/462.08, 462.09, 462.1, 462.11; 356/448; 358/300; 382/274
See application file for complete search history.

(56) References Cited

U.S. PATENT DOCUMENTS

| | | | |
|---|---|---|---|
| 5,113,445 A | | 5/1992 | Wang |
| 5,461,440 A | * | 10/1995 | Toyoda et al. ............ 396/311 |
| 5,754,709 A | * | 5/1998 | Moriya et al. ............ 382/274 |
| 5,760,382 A | | 6/1998 | Li et al. |
| 5,784,065 A | * | 7/1998 | Kakutani ............ 345/591 |
| 5,856,876 A | * | 1/1999 | Sasanuma et al. ............ 358/300 |
| 5,992,748 A | * | 11/1999 | Takahashi et al. ....... 235/462.04 |
| 6,070,805 A | | 6/2000 | Kaufman et al. |
| 6,313,924 B2 | * | 11/2001 | Kanamori ............ 358/1.9 |
| 6,906,827 B1 | * | 6/2005 | Katayama ............ 358/1.9 |
| 7,365,854 B2 | * | 4/2008 | Gaon ............ 356/448 |
| 2005/0023354 A1 | * | 2/2005 | Sali et al. ............ 235/462.04 |
| 2005/0109846 A1 | * | 5/2005 | Lubow ............ 235/462.01 |
| 2005/0284944 A1 | | 12/2005 | Ming |

FOREIGN PATENT DOCUMENTS

JP       2003-178277       6/2003

OTHER PUBLICATIONS

Japanese Office Action, dated Mar. 21, 2012, in a counterpart Japanese patent application, No. JP 2007-046710.

\* cited by examiner

*Primary Examiner* — Christopher Stanford
(74) *Attorney, Agent, or Firm* — Chen Yoshimura LLP

(57) ABSTRACT

Disclosed is a method for determining optimum color gradation levels used by a color gradation barcode in a system including a rendering device for rendering the barcode and a detector for detecting the barcode. The method includes: (a) obtaining input color gradation data; (b) rendering, by using the rendering device, a test pattern based on the input color gradation data, the test pattern comprising at least one color gradation pattern; (c) detecting, by using the detector, the rendered test pattern to generate detected color gradation data; (d) based on the detected color gradation data and the input color gradation data, determining a plurality of optimum color gradation levels to be used for a color gradation barcode; and (e) storing the plurality of optimum color gradation levels.

20 Claims, 3 Drawing Sheets

COLOR BARCODE WITH ENHANCED CAPACITY AND READABILITY FOR A CLOSED LOOP SYSTEM

BACKGROUND OF THE INVENTION

1. Field of the Invention

This invention relates to machine-readable color symbology for encoding data, such as color barcodes, and in particular, it relates to a method for enhancing the data capacity and readability of color gradation barcodes for a closed loop system.

2. Description of the Related Art

Barcodes are a form of machine-readable symbology for recording digital information. One-dimensional and two-dimensional black and white barcodes have been widely used. To increase data capacity, two dimensional color barcodes have been proposed, which use color in addition to the intensity of light reflection to represent information. For example, U.S. Pat. No. 6,070,805 describes a distortion-resistant color barcode symbology that uses two sets of colors (red, green, and blue, and cyan, magenta and yellow). In another example, U.S. Patent Application Publication 2005/0284944 A1 describes using six colors (red, orange, blue, green, yellow and pink) in a color barcode.

The rendering and detection of color are influenced by many factors. To apply a color barcode on a recoding medium such as paper, transparency, plastic sheet, fabric, etc., a color printer is used to print the barcode. Color printers typically use toning materials, such as color inks and toner particles, of the subtractive colors, i.e., cyan (C), magenta (M) and yellow (Y). Together with black (K), they are often referred to as CMYK colors. Colors printed by a printer depend to a certain extent on the characteristics of the toning material sets used by the printer. Color barcode may also be displayed on a display device such as CRT, LCD display, etc. Color displays typically use display pixels having additive colors, i.e., red (R), green (G) and blue (B). To read a color barcode, a color scanner or other detector device is used to scan the barcode. A color scanner or detector typically uses a set of color filters (e.g. RGB filters) to detect the color of the received light. In addition, both a printer or display device and a scanner use software to manage color data. For example, different software may use different color profiles for converting between RGB and CMYK colors. Thus, the same digital color data (e.g. as described by the RGB values of a color) often results in different printed colors when printed by different printers. Sometimes the printed colors also depend on the characteristics of the recording medium. Likewise, the same printed color often results in different digital color data when scanned by different scanners. The same is true for displayed colors. Further, the same digital color data often result in different colors when displayed on a display device and when printed. As a result of these factors, it is often difficult to accurately produce, measure and reproduce color.

These hardware factors limit the data capacity and readability of color barcodes. For example, even if a printer can nominally print 8-bit color data per color (i.e. 256 color gradation levels), a scanner usually cannot accurately measure 256 shades of a color printed by a printer.

SUMMARY OF THE INVENTION

The present invention is directed to a method that allows detection of the capabilities of a printer and a scanner used in a closed loop system to provide a color barcode having maximum data capacity and readability for the given printer/scanner combination.

An object of the present invention is to provide a color barcode which can be printed and scanned back reliably using any given printer/scanned hardware system and provide maximum data capacity.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for determining optimum color gradation levels used by a color gradation barcode in a system including a rendering devices for rendering the barcode and a detector for detecting the barcode, which includes: (a) obtaining input color gradation data; (b) rendering, using the rendering device, a test pattern based on the input color gradation data, the test pattern comprising at least one color gradation pattern; (c) detecting, using the detector, the rendered test pattern to generate detected color gradation data; (d) based on the detected color gradation data and the input color gradation data, determining a plurality of optimum color gradation levels to be used for a color gradation barcode; and (e) storing the plurality of optimum color gradation levels.

In another aspect, the present invention provides a method for generating color gradation barcode data, which includes: (a) identifying a class of rendering devices intended to be used to render a color gradation barcode and a class of detectors intended to be used to detect the color gradation barcode; (b) retrieving color gradation barcode configuration data specific for the class of rendering devices and the class of detectors, the color gradation barcode configuration data including optimum color gradation levels to be used in the color gradation barcode; and (c) generating color gradation barcode data according to the retrieved color gradation barcode configuration data.

The present invention is also directed to computer program products that cause a data processing apparatus to perform the above methods.

In yet another aspect, the present invention provides a system for determining optimum color gradation levels of a color gradation barcode, which includes: a scanner for scanning a test pattern printed on a recording medium to generate scanned color gradation data, the test pattern comprising at least one color gradation pattern printed based on input color gradation data; and a controller for determining a plurality of optimum color gradation levels to be used for a color gradation barcode based on the detected color gradation data and the input color gradation data.

In yet another aspect, the present invention provides a system for printing color gradation barcodes, which includes: a printer for printing a color gradation barcode; and a controller connected to the printer for selecting a color gradation barcode configuration from a plurality of color gradation barcode configurations based on an identification of a class of printers to which the printer belongs and an identification of a class of scanners intended to be used to scan the color gradation barcode, and for generating color gradation barcode data according to the selected color gradation barcode configuration.

It is to be understood that both the foregoing general description and the following detailed description are exemplary and explanatory and are intended to provide further explanation of the invention as claimed.

DETAILED DESCRIPTION OF THE PREFERRED EMBODIMENTS

As mentioned earlier, due to various hardware factors, the color rendering characteristics of different rendering devices (printers, display devices, projectors, etc.) and the color detection characteristics of different detectors (scanners or other types of detecting devices) are often different. For a particular class of devices, such as printers of the same model from the same manufacturer controlled by the same drive software and using the same ink sets, however, the color rendering or color detecting characteristics are much more consistent among different individual devices. Accordingly, embodiments of the present invention provide a method that allows detection of the color capabilities of a combination of a given rendering device and a given detector, or a given class of rendering devices and a given class of detectors, sometimes referred to as a closed loop system, to provide a color gradation barcode having maximum data capacity and readability for the given rendering device and detector combination. In other words, the method maximizes data capacity of a color gradation barcode by limiting the choices of hardware.

The descriptions below use a printer and a scanner as an example of a closed loop system, but the invention applies generally to other types of rendering devices and detectors. Further, the printer may be an ink jet printer, laser printed, silver-halide printer, etc.

Figure 1:
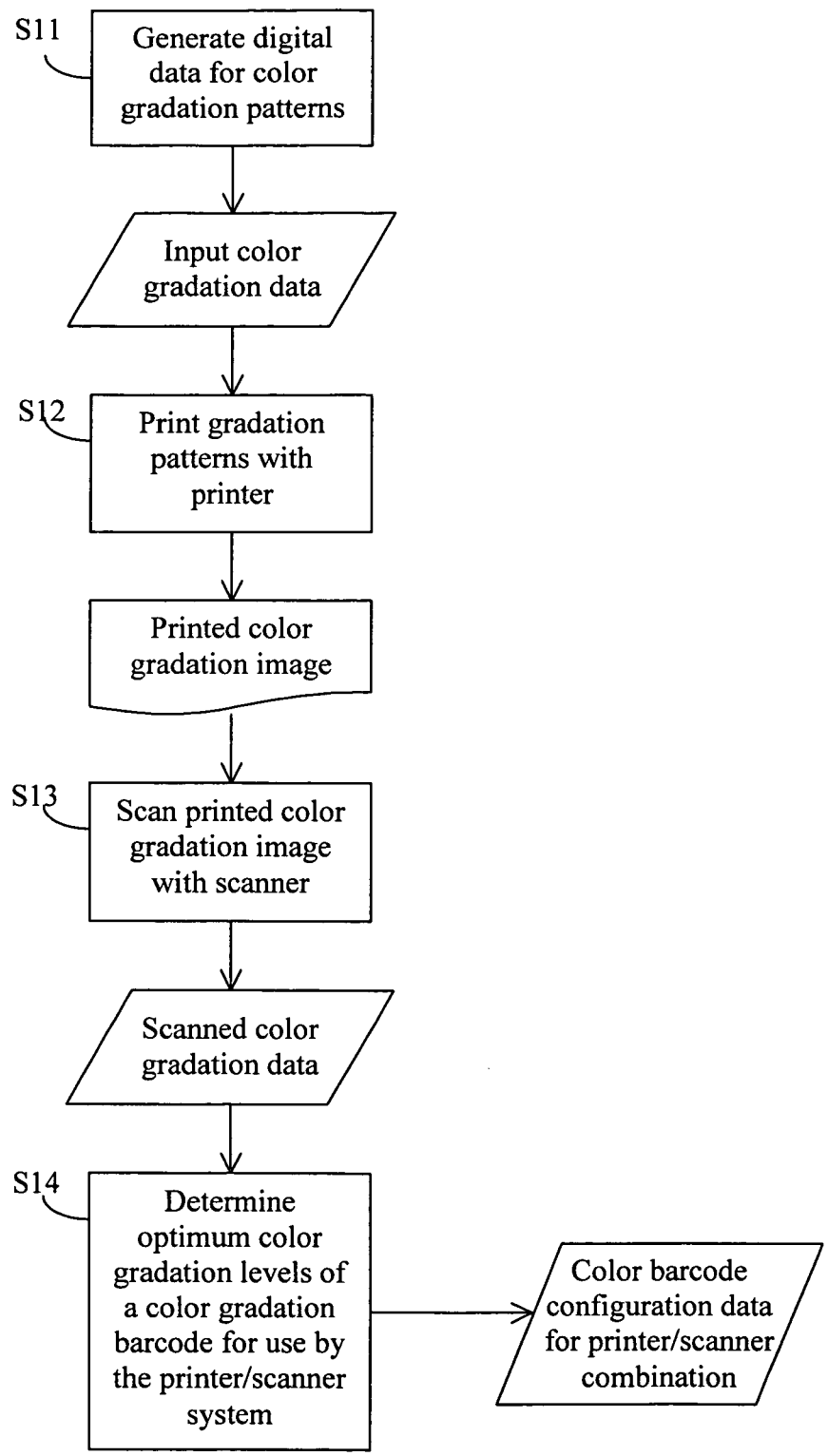
FIG. 1 is a flowchart illustrating a method for detecting the color capabilities of a printer and scanner combination according to an embodiment of the present invention.

FIG. 1 illustrates a method according to an embodiment of the present invention for detecting the color capabilities of a printer and scanner combination. First, digital data for one or more color gradation patterns (the input color gradation data) is generated (step S11). Each color gradation pattern may be for one of the primary additive colors (R, G or B) or one of the primary subtractive colors (C, M or Y), or any other color including gray (black). Preferably, three color gradation patterns for a set of RGB colors or four color gradations for a set of CMYK colors are generated. In a case where the color gradation pattern represents an achromatic gray scale and this achromatic color gradation pattern is reproduced by a color printer using C, M, Y, and K toners, this color gradation pattern can be reproduced by the combination of the C, M, and Y toners. Alternatively, the achromatic color gradation pattern can be reproduced by using K toner only. Yet alternatively, two achromatic color gradation patterns can be reproduced by the combination of these chromatic (C, M, and Y) toners and by the achromatic (K) toners, respectively. For each color, the gradation levels may vary from 0 to 255 (corresponding to 8 bit data), or some other suitable range. The input color gradation data is submitted to a printer to print the gradation patterns on a recording medium (step S12). The printed gradation pattern for each color may be in the shape of a bar, a matrix or other suitable shapes, where the gradation values correspond to the positions in the pattern. For example, in a gradation bar, the gradation value may vary linearly from the minimum value to the maximum value along the bar. The printed gradation patterns (correctively referred to as a test pattern) are then scanned using a scanner to generate scanned color gradation data (step S13). During the print and scan processes, the printer and scanner use their internal hardware and software to perform necessary processing such as color conversion, filtering, etc. The printer and the scanner, with their hardware configurations and software settings, form a closed loop system. A comparison of the scanned color gradation data (the output of the closed loop system) with the input color gradation data (the input to the closed loop system) will indicate the color capabilities of the system, and can be used to determine the optimum color gradation levels of a color gradation barcode for use by the printer/scanner system (step S14).

A method of determining the optimum color gradation levels (step S14) is described with reference to FIG. 2. Ideally, if the printer/scanner system had no error, the scanned gradation value at any location of the gradation pattern would be identical to the input gradation value for that location. In reality, due to the errors and other factors in the system, the gradation values cannot be reliably measured at every individual input gradation value, but can only be reliably measured within ranges (segments) of gradation values. As a result, the printer/scanner system can only reliably use a limited number of gradation levels in a color barcode, typically far fewer than the number of gradation levels in the input color image data (e.g. 256 levels or 8 bits per color). The step of determining the optimum color gradation levels (step S14) compares the scanned gradation data with the corresponding input gradation data to determine the smallest segments of gradation values that would give accurate correlation between the scanned gradation data and the input gradation data within each segment. The smaller the gradation segments, the more gradation levels (segments) that can be reliably measured and the higher the data capacity of the gradation barcode. The data capacity of the system is dependent on both the printer's ability to print the various gradations of colors and the scanner's ability to measure these gradations.

Figure 3:
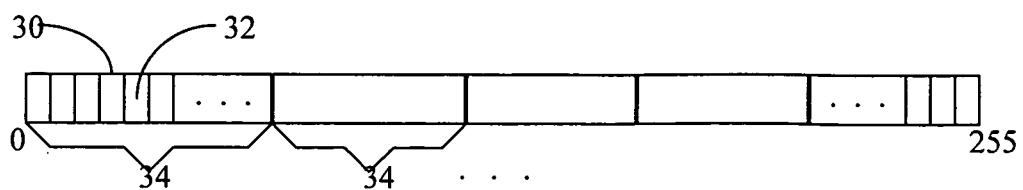
FIG. 3 illustrates a color gradation bar and segments of gradation ranges.

FIG. 3 illustrates a printed gradation bar 30 comprising a plurality of gradation levels 32 arranged along the bar (from 0 to 255 in this example). The gradation bar 30 is shown as divided into a plurality of gradation segments 34.

Figure 2:
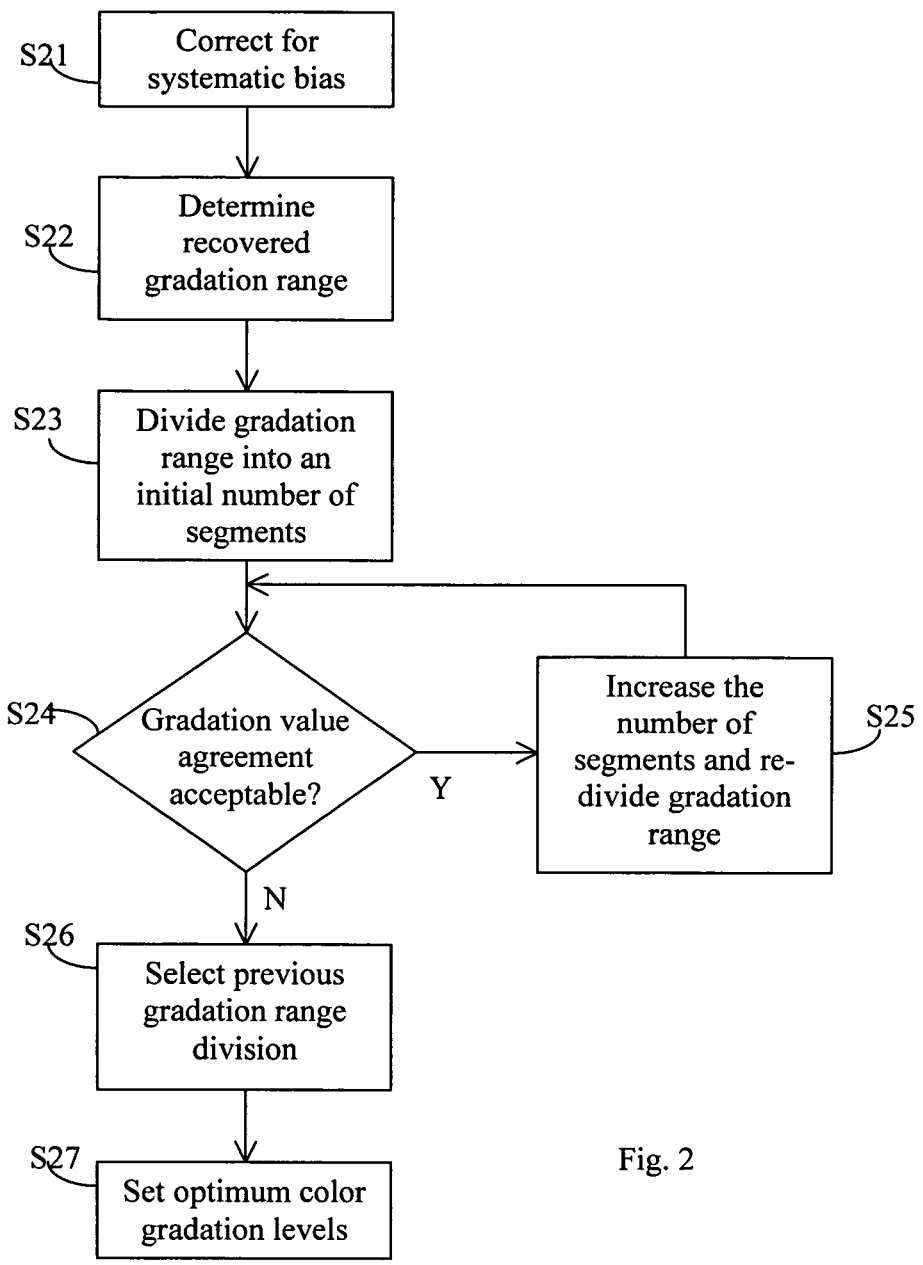
FIG. 2 is a flowchart illustrating a method of determining optimum color gradation levels according to an embodiment of the present invention.

Referring to FIG. 2, the scanned color gradation data is first corrected for systematic bias (step S21). For example, the scanned color gradation data may be darker or lighter than the input color gradation data at all levels, and such bias can be corrected. The recovered gradation range, i.e. the difference between the maximum and minimum gradation values for which the scanned data can be reliably used, is determined (step S22). For example, the scanned gradation data may be saturated at one end of the gradation scale and the saturated data should be discarded. The recovered gradation range is initially divided into a plurality of relatively coarse segments (step S23). The sizes of the segments may be uniform or non-uniform. The scanned gradation data is compared to the corresponding input gradation data in each segment to determine if the values agree with each other (step S24). Any suitable algorithms may be used for the comparison to determine whether the agreement is acceptable. In one example, a mean value of the difference between the input and scanned color gradation data for all gradation levels within each segment is calculated, and the agreement between the input and scanned gradation values is deemed acceptable if the mean difference is less than a predetermined threshold in each gradation segment. In another example, the agreement between the input and scanned gradation values is deemed acceptable if the number of input data values within each segment that have corresponding scanned gradation values falling outside of the segment is smaller than a predetermined threshold number. If the gradation value agreement is acceptable ("Y" in step S24), the number of gradation segments is increased and the recovered gradation range is re-divided into generally smaller segments (step S25). Step S24 is repeated to determine if the gradation value agreement is acceptable at the finer gradation range division. Steps 25 and 24 are repeated until the gradation value agreement is no longer acceptable ("N" in step S24), at which point the previous gradation range division is selected (step S26). The optimum color gradation levels are selected based on this division (step S27). For example, the center values for the gradation segments may be used as the optimum color gradation levels.

The method shown in FIG. 2 is only an example of a method for determining the optimum color gradation levels based on the scanned color gradation data and the input color gradation data. Other algorithms may be used to determine the optimum color gradation levels. According to one method, a mean difference between the scanned color gradation data and the input color gradation data for the entire gradation range is calculated, and the optimum color gradation levels are determined based on the mean difference. For example, the optimum color gradation levels may be such that the distance between adjacent gradation levels is several times the mean difference. According to another method, the difference between the scanned color gradation data and the input color gradation data is calculated for all gradation values, and gradation segments having relatively small amount of such differences are selected to set the optimum gradation levels to be used in barcodes.

The process of FIG. 2 is performed for all gradation patterns of different colors in the test pattern. The optimum color gradation levels so determined are stored as a part of the color gradation barcode configuration data for the printer and scanner combination (see FIG. 1). The configuration data can be stored in a computer, printer or scanner for future use.

When a barcode renderer program generates color gradation barcode data based on the optimum color gradation levels, each tile in the barcode will have a gradation value that is one of the optimum color gradation levels. Thus, each tile can have N possible values (per color) if there are N optimum gradation levels. The total number of possible values per tile, including all colors, determines the data capacity of the color gradation barcode. The invention is equally applicable to one-dimensional color barcodes, where each line in the barcode has a color gradation value.

The optimum color gradation levels determined by the above-described process are specific to the closed loop system including the particular printer and scanner. Since devices (printers or scanners) of the same model (or the same series, the same product line, the same manufacturer, etc.) will tend to have similar characteristics, the device-to-device variation within the same model being much smaller than variations between devices of different models, the optimum color gradation level determination process described above may be performed to establish color gradation barcode configuration data for a class (e.g. model, series, manufacturer, etc.) of printers and a class of scanners. Such configuration data may then be used in a combination of a printer from the printer class and a scanner from the scanner class.

Figure 4:
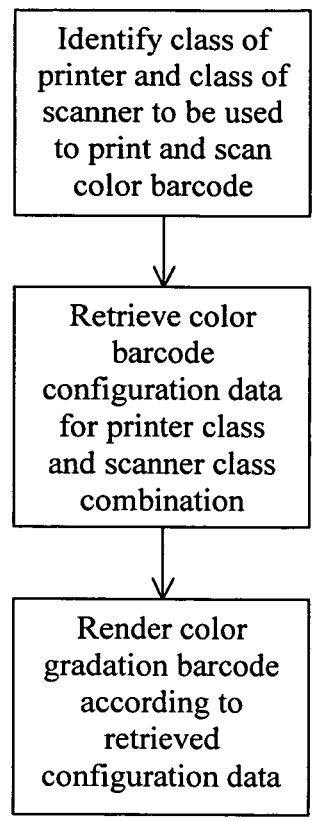
FIG. 4 is a flowchart illustrating method according to another embodiment of the present invention.

The process of detecting the capabilities of the printer/scanner combination and determining optimum color gradation levels may be performed for many printer/scanner combinations or printer class/scanner class combinations, and the corresponding configuration data for each combination may be stored for future use. When a barcode renderer program renders a color gradation barcode, the program will determine (e.g. by querying the user) what printer or class of printers will be used to print the barcode and what scanner or class of scanners is intended to scan the barcode. The barcode renderer program will then use the stored barcode configuration data for this printer/scanner combination to render the barcode data. This process is illustrated in FIG. 4. The barcode renderer program may reside on a computer connected to one or more printers, or on a printer itself.

The optimum color gradation level data used for a color gradation barcode, information about the class of the printer used to print the barcode and the class of intended scanners, and/or other configuration information can be encoded in a barcode and printed with the color barcode itself. Preferably, a black and white barcode is used to encode such information. This enables a scanner to determine whether the color gradation barcode is intended for itself and to properly detect the gradation levels of the tiles in the barcode. The scanner may display a message to a user if it is not an intended scanner so that the user may choose to scan the barcode with another scanner. Even when the scanner is not an intended of scanner, the optimum color gradation level information may still be useful in allowing the scanner to more intelligently detect the gradation levels present in the barcode.

Figure 5:
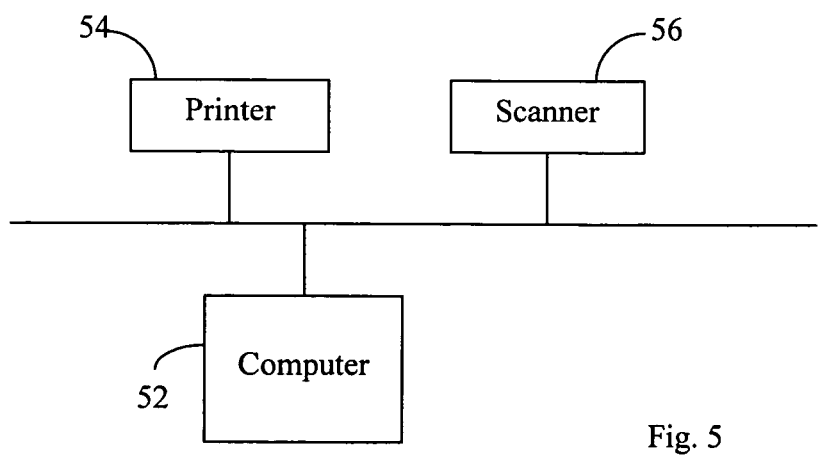
FIG. 5 schematically illustrates a system in which embodiments of the present invention may be implemented.

The methods described above may be implemented by a computer software program running on a computer, a printer, a scanner, and/or other data processing apparatus. FIG. 5 illustrates a system in which the methods may be implemented, including a computer 52, a printer 54 and a scanner 56 connected to each other by a network or other communication links. One embodiment of the invention is a computer loaded with a program for determining optimum color gradation levels based on input color gradation data and scanned color gradation data. Another embodiment of the invention is a scanner having a processor and a ROM loaded with a program for scanning a test pattern and determining optimum color gradation levels based on input color gradation data and scanned color gradation data. Another embodiment of the invention is a computer loaded with a program for rendering color barcode data according to barcode configuration data for a particular printer/scanner combination in a process shown in FIG. 4. Another embodiment of the invention is a printer having a processor and a ROM loaded with a program for printing color barcode data according to barcode configuration data for a particular printer/scanner combination.

It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A method for determining optimum color gradation levels used by a color gradation barcode in a closed loop system including a rendering device for rendering the barcode and a detector for detecting the barcode, the method comprising:

(a) obtaining input color gradation data;

(b) rendering, by using the rendering device, a test pattern based on the input color gradation data, the test pattern comprising at least one color gradation pattern containing a first plurality of color gradation levels;

(c) detecting, by using the detector, the rendered test pattern to generate detected color gradation data;

(d) based on comparison of an input to the closed loop system which is the input color gradation data for the test pattern and an output of the closed loop system which is the detected color gradation data from the same test pattern, selecting a second plurality of color gradation levels from the first plurality of color gradation levels to be used for producing a color gradation barcode, where the number of the second plurality of color gradation levels is fewer than the number of the first plurality of color gradation levels; and (e) storing the second plurality of color gradation levels.

2. The method of claim 1, wherein the test pattern comprises a plurality of color gradation patterns for a plurality of different colors, and wherein step (d) is performed for each color.

3. The method of claim 2, wherein the rendering device is a printer, wherein in step (b) the test pattern is printed on a recording medium using a plurality of primary colors, and wherein the plurality of gradation patterns respectively correspond to the primary colors.

4. The method of claim 1, wherein the color gradation barcode is a two-dimensional barcode.

5. The method of claim 1, wherein step (d) comprises comparing the detected color gradation data and the input color gradation data for each of the first plurality of color gradation level in the color gradation pattern.

6. A method for determining optimum color gradation levels used by a color gradation barcode in a system including a rendering device for rendering the barcode and a detector for detecting the barcode, the method comprising:

(a) obtaining input color gradation data;

(b) rendering, by using the rendering device, a test pattern based on the input color gradation data, the test pattern comprising at least one color gradation pattern;

(c) detecting, by using the detector, the rendered test pattern to generate detected color gradation data;

(d) based on the detected color gradation data and the input color gradation data, determining a plurality of optimum color gradation levels to be used for a color gradation barcode, wherein step (d) comprises:

(d1) determining a recovered gradation range;

(d2) initially dividing the recovered gradation range into a number of gradation segments;

(d3) determining whether an agreement between the detected gradation data and the corresponding input gradation data in each segment is acceptable;

(d4) if the agreement is acceptable, re-dividing the recovered gradation range into an increased number of gradation segments and repeating step (d3); and (d5) if the agreement is not acceptable, selecting a previous gradation range division and setting the optimum color gradation levels based on the selected gradation range division; and (e) storing the plurality of optimum color gradation levels.

7. The method of claim 6, wherein step (d) further comprising correcting the detected color gradation data for systematic bias.

8. The method of claim 6, wherein in step (d5), center values of each gradation segment are set as the optimum color gradation levels.

9. The method of claim 6, wherein step (d3) comprises:
calculating a mean difference between the detected color gradation data and the input color gradation data of all gradation levels within each gradation segment; and
determining whether the mean difference for each gradation segment is smaller than a predetermined threshold value.

10. The method of claim 1, wherein step (d) comprises:

(d1) determining a recovered gradation range;

(d2) calculating a mean difference between the detected color gradation data and the input color gradation data of all gradation levels in the recovered gradation range;

(d3) determining the second plurality of color gradation levels based on the calculated mean difference.

11. A computer program product comprising a non-transient computer usable medium having a computer readable code embodied therein for controlling a data processing apparatus, the computer readable program code configured to cause the data processing apparatus to execute a process for determining optimum color gradation levels used by a color gradation barcode in a closed loop system including a rendering devices and a detector, the process comprising the steps of:

(a) receiving input color gradation data;

(b) receiving detected color gradation data, the detected color gradation data having been obtained by rendering a test pattern comprising at least one color gradation pattern containing a first plurality of color gradation levels using the rendering device based on the input color gradation data and detecting the rendered test pattern using the detector;

(c) based on comparison of an input to the closed loop system which is the input color gradation data for the test pattern and an output of the closed loop system which is the detected color gradation data from the same test pattern, selecting a second plurality of color gradation levels from the first plurality of color gradation levels to be used for producing a color gradation barcode, wherein the number of the second plurality of color gradation levels is fewer than the number of the first plurality of color gradation levels; and (d) storing the second plurality of color gradation levels.

12. A closed loop system for determining optimum color gradation levels of a color gradation barcode, comprising:

a scanner for scanning a test pattern printed on a recording medium to generate scanned color gradation data, the test pattern comprising at least one color gradation pattern containing a first plurality of color gradation levels printed based on input color gradation data; and a controller for selecting a second plurality of color gradation levels from the first plurality of color gradation levels to be used for producing a color gradation barcode based on comparison of an input to the closed loop system which is the input color gradation data for the test pattern and an output of the closed loop system which is the detected color gradation data from the same test pattern, where the number of the second plurality of color gradation levels is fewer than the number of the first plurality of color gradation levels.

13. The system of claim 12, further comprising a printer for printing the test pattern.

14. The computer program product of claim 11, wherein the test pattern comprises a plurality of color gradation patterns for a plurality of different colors, and wherein step (c) is performed for each color.

15. The computer program product of claim 11, wherein step (c) comprises comparing the detected color gradation data and the input color gradation data for each of the first plurality of color gradation level in the color gradation pattern.

16. The computer program product of claim 11, wherein step (c) comprises:
   (c1) determining a recovered gradation range;
   (c2) calculating a mean difference between the detected color gradation data and the input color gradation data of all gradation levels in the recovered gradation range;
   (c3) determining the second plurality of color gradation levels based on the calculated mean difference.

17. A computer program product comprising a non-transient computer usable medium having a computer readable code embodied therein for controlling a data processing apparatus, the computer readable program code configured to cause the data processing apparatus to execute a process for determining optimum color gradation levels used by a color gradation barcode in a system including a rendering devices and a detector, the process comprising the steps of:
   (a) receiving input color gradation data;
   (b) receiving detected color gradation data, the detected color gradation data having been obtained by rendering a test pattern comprising at least one color gradation pattern using the rendering device based on the input color gradation data and detecting the rendered test pattern using the detector;
   (c) based on the detected color gradation data and the input color gradation data, determining a plurality of optimum color gradation levels to be used for a color gradation barcode, wherein step (c) comprises:
   (c1) determining a recovered gradation range;
   (c2) initially dividing the recovered gradation range into a number of gradation segments;
   (c3) determining whether an agreement between the detected gradation data and the corresponding input gradation data in each segment is acceptable;
   (c4) if the agreement is acceptable, re-dividing the recovered gradation range into an increased number of gradation segments and repeating step (c3); and
   (c5) if the agreement is not acceptable, selecting a previous gradation range division and setting the optimum color gradation levels based on the selected gradation range division; and
   (d) storing the plurality of optimum color gradation levels.

18. The computer program product of claim 17, wherein step (c) further comprising correcting the detected color gradation data for systematic bias.

19. The computer program product of claim 17, wherein in step (c5), center values of each gradation segment are set as the optimum color gradation levels.

20. The computer program product of claim 17, wherein step (c3) comprises:
   calculating a mean difference between the detected color gradation data and the input color gradation data of all gradation levels within each gradation segment; and
   determining whether the mean difference for each gradation segment is smaller than a predetermined threshold value.

* * * * *